United States Patent [19]
Sunouchi

[11] Patent Number: 6,069,900
[45] Date of Patent: May 30, 2000

[54] BAUD RATE GENERATOR

[75] Inventor: Shigemi Sunouchi, Yamagata, Japan

[73] Assignee: NEC Corporation, Tokyo, Japan

[21] Appl. No.: 08/972,675

[22] Filed: Nov. 18, 1997

[30] Foreign Application Priority Data

Nov. 19, 1996 [JP] Japan ..................................... 8-308487

[51] Int. Cl.$^7$ .................................................. H04J 3/06
[52] U.S. Cl. .......................................... 370/507; 370/516
[58] Field of Search .................................... 370/465, 503,
370/508, 516, 517, 518, 519, 532, 539,
538, 540, 507; 340/825, 825.14, 825.2;
375/225, 340; 714/819, 820, 821

[56] References Cited

U.S. PATENT DOCUMENTS

| | | | |
|---|---|---|---|
| 5,008,902 | 4/1991 | Key et al. | 375/225 |
| 5,049,875 | 9/1991 | DeLuca et al. | 340/825.44 |
| 5,490,209 | 2/1996 | Kennedy et al. | 379/97 |
| 5,631,924 | 5/1997 | Callaway, Jr. et al. | 375/225 |
| 5,682,147 | 10/1997 | Eaton et al. | 340/825.03 |
| 5,852,615 | 12/1998 | Holo et al. | 714/712 |

OTHER PUBLICATIONS

User's Manual μPD78054, μPD78054Y Sub–series 8–bit single chip microcomputer, Material No. IEU–824B, Rev. 4, p. 424, 1996 NEC Document 1.

*Primary Examiner*—Tesfaldet Bocure
*Assistant Examiner*—Kwang B. Yao
*Attorney, Agent, or Firm*—Foley & Lardner

[57] ABSTRACT

A baud rate generator in a data communication system comprises a first and second counter for counting clocks in a clock signal to generate a transmission and reception counts, first and second match detection circuits each for detecting a match between the transmission or reception count and a reference value to generate a transmission baud rate signal or reception baud rate signal, a third match detection circuit for detecting a match between the transmission baud rate signal and the reception baud rate signal, and a control section for controlling a transmission station and a receiving station for restart transmission if a mismatch is found in the third match detection section. A quick restart of data transmission can be obtained if a transmission error is found.

5 Claims, 7 Drawing Sheets

BAUD RATE GENERATOR

BACKGROUND OF THE INVENTION (a) Field of the Invention

The present invention relates to a baud rate generator and, more particularly, to an asynchronous baud rate generation circuit in an asynchronous communication used for communication between microcomputers.

(b) Description of the Related Art

A Universal Asynchronous Receiver/Transmitter (hereafter UART) method is widely used as a serial transmission for communicating between microcomputers. It is important in the UART to assure the transmission of a large data volume in a high transfer rate.

The UART method for communicating between two DTE (Data Terminal Equipment) is used for any one of modes including a one-way communication without a return path, a half-duplex communication which has two-way communication but not in both directions simultaneously, and a full-duplex communication which enables a full two-way communication in duplication. In the UART method, data is sent by each frame for transmission/reception at a predetermined transfer rate as a baud rate, or a number of bits per second.

Figure 1:
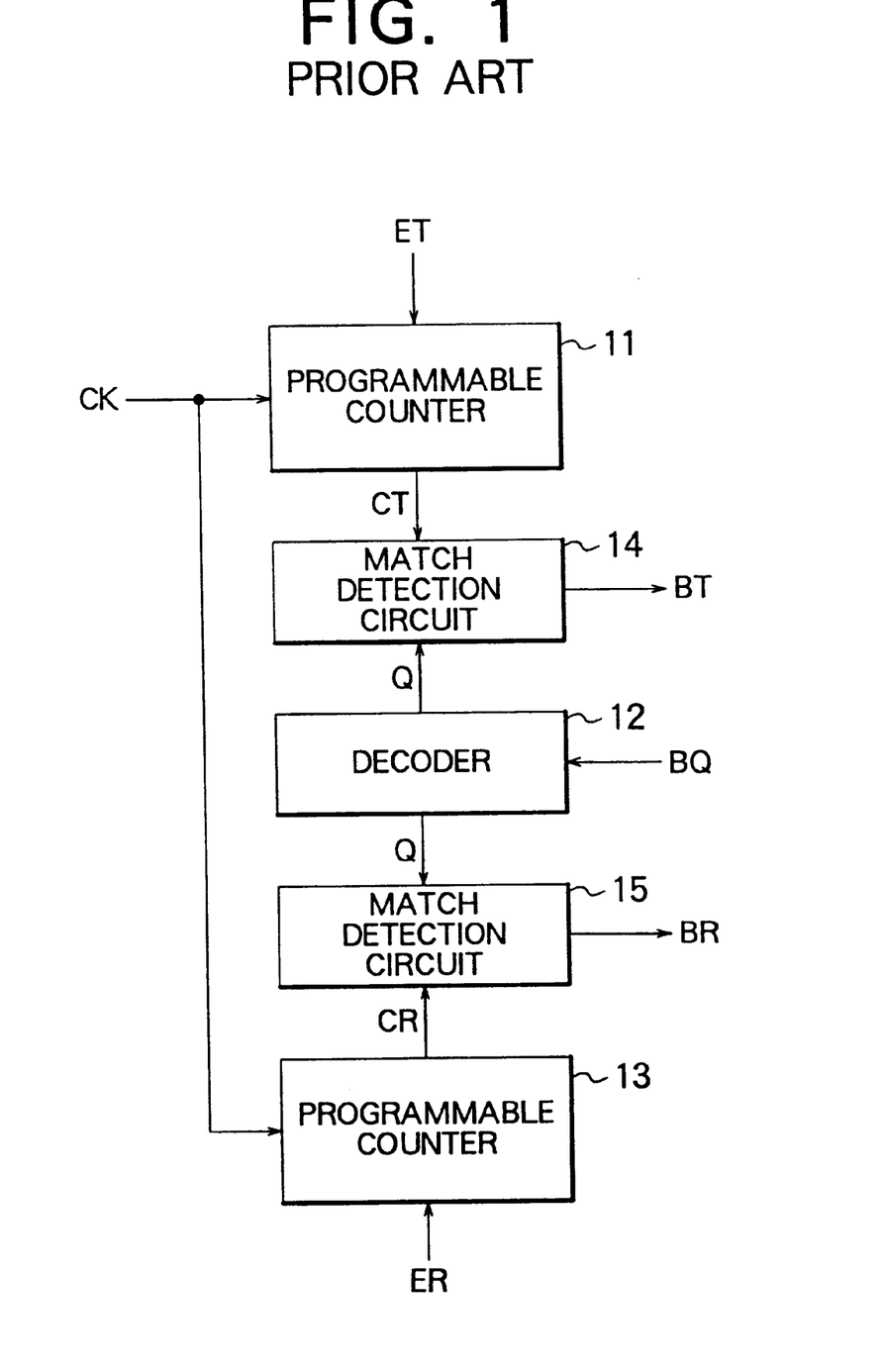
FIG. 1 is a block diagram of an example of conventional baud rate generation circuits.

One of a conventional microcomputers is a single chip microcomputer known as μPD78054 manufactured by NEC (see User's Manual μPD78054, μPD78054Y Sub-series 8-bit single chip microcomputer, Material No.IEU-824B, Rev. 4, Page 424, 1996 NEC Document 1). FIG. 1 is a flowchart showing a conventional baud rate generation circuit which is applicable for both a half-duplex and a full-duplex communications. The conventional baud rate generation circuit performs transmission and reception in an asynchronous mode, and comprises a first programmable counter 11 for counting a clock CK to generate a transmission count CT, a second programmable counter 13 for counting the clock CK to generate a reception count CR, a decoder 12 for setting a specified reference value Q in response to a setting signal BQ sent from a control register not shown, match detection circuits 14 and 15 for generating baud rate signals BT and BR, respectively, when a baud rate after a match of the counts CT or CR with the reference value Q is detected.

Figure 2:
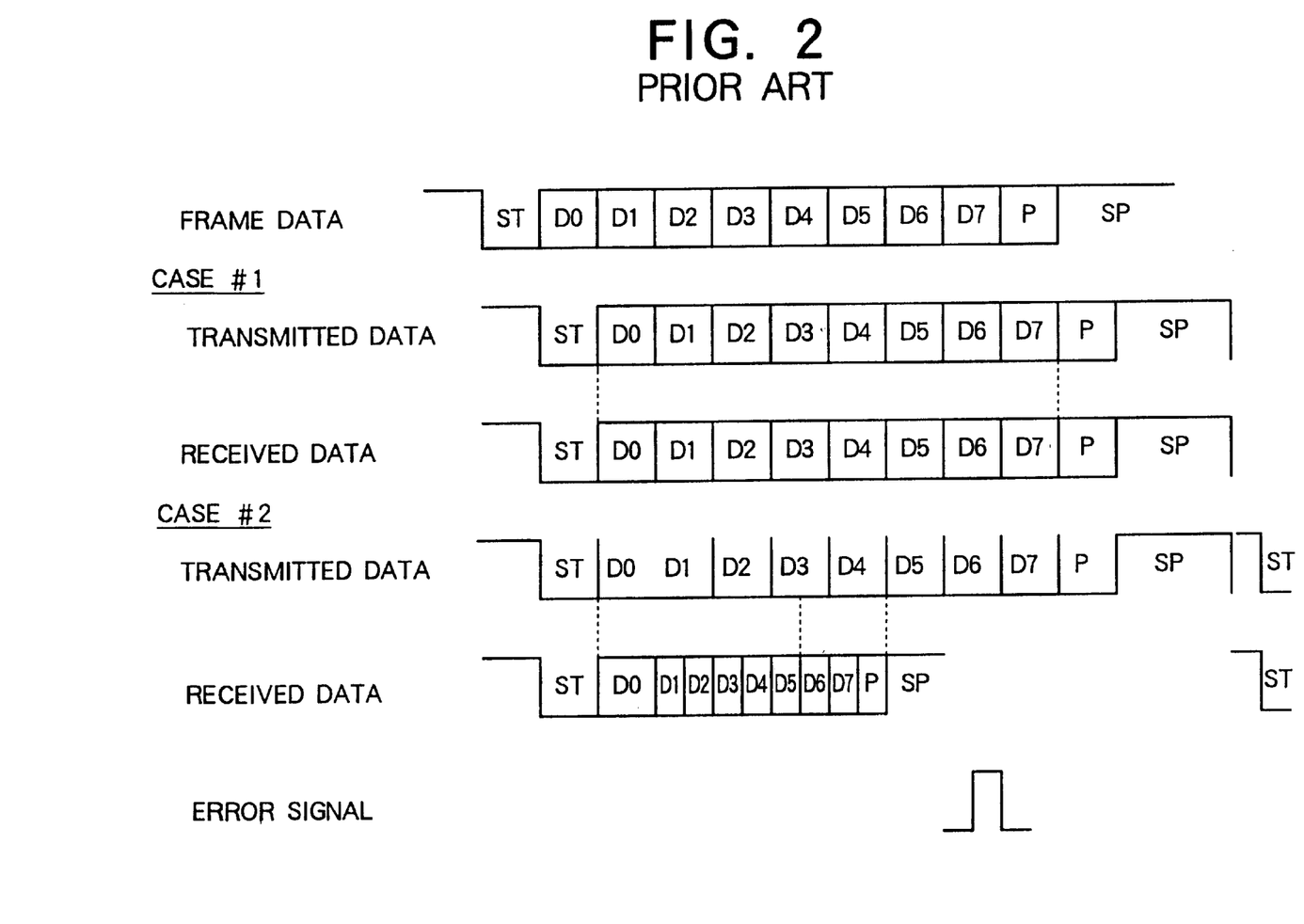
FIG. 2 is a timing chart of a UART signal format and an example of the operation of the conventional baud rate generation circuit of FIG. 1.

FIG. 2 is a timing chart showing UART data format for data transmission/reception and timing clocks of baud rates showing when the baud rates are matched or mismatched between a transmitting station and a receiving station. Referring to FIGS. 1 and 2, before performing the half-duplex transmission, the reference value Q is set in the decoder 12 responding to the setting signal BQ. The first programmable counter 11 in the transmitting station is activated responding to a transmission enable signal ET for counting the clock CK to generate a transmission count CT. The first match detection circuit 14 in the transmitting station supplies a requested transmission baud rate signal BT after the reference value Q and the transmission count are found to be matched therebetween. Similarly, the second programmable counter 13 in the receiving station is activated responding to an receiving enable signal ER for counting the clock CK to generate a reception count CR. The second match detection circuit 15 in the receiving station generates a requested reception baud rate signal BR after the specified value Q and the reception count CR are found to be matched therebetween.

In FIG. 2, one frame data in the UART format includes a start bit ST, character bits D0–D6/D7 including 7 or 8 bits, a parity bit P, and a stop bit SP which may include 2 bits. The parity bit P represents odd/even parity or 0 parity/non-parity. Each bit is transmitted and received in a specified baud rate.

When the programmable counters 11 in the transmitting station and 13 in the receiving station normally operate to correctly generate the baud rates as shown in case #1 in FIG. 2, the parity bit P and the stop bit SP are correctly detected in both transmitted or received frame, and the transmission is finished normally. On the other hand, if a baud rate is not correctly generated due to a counting error by the programmable counter 1 or 3 which causes mismatch of transmission or reception baud rate as shown in case #2 in FIG. 2, the stop bit SP cannot be detected until the completion of one data frame transmission. The receiving station determines that the stop bit SP is not detected and feeds a communication error signal by using another port for retry.

The conventional communication system has a disadvantage in that when a baud rate mismatch occurs between the transmission baud rate and the reception baud rate due to a communication error, it can be detected only after the completion of one frame data transmission between the transmitting station and the receiving station.

There is another disadvantage that the baud rate cannot be identified as a single rate because a counting error caused by noise or other interference in the baud rate cannot be detected and the baud rate obtained is output as it is.

SUMMARY OF THE INVENTION

It is an object of the present invention to provide a baud rate generation circuit capable of generation of a correct baud rate for use in a UART half-duplex communication.

The present invention provides a data communication system comprising: a transmitting station for transmitting data; a receiving station for receiving the data transmitted by the transmitting section; and a baud rate generator disposed in the transmitting station, the baud rate generator including first and second counters for counting clocks in a clock signal from a specified time to generate a first count and a second count, respectively, a decoder for setting a reference value in response to a set instruction signal, a first match detection circuit for detecting a match between said reference value and the first count to generate a first match signal, a second match detection circuit for detecting a match between the reference value and the second count to generate a second match signal, a third match detection circuit for observing a mismatch between the first match signal and the second match signal to generate an error signal upon the mismatch, and a control section for controlling the transmitting station and the receiving section, upon occurrence of the error signal, to re-transmit data starting from the specified time between the transmitting station and the receiving station.

Also the present invention provides a data communication system comprising: a transmitting station for transmitting data; a receiving station for receiving the data transmitted by the transmitting section; and a baud rate generator disposed in the transmitting station, the baud rate generator including first through third counters for counting clocks in a clock signal from a specified time to generate a first through third counts, respectively, a decoder for setting a reference value in response to a set instruction signal, a first through third match detection circuits for detecting matches between the reference value and said first count to generate a first match signal, between the reference value and the second count to generate a second match signal, between the reference value and the third counts to generate a third match signal, respectively, a majority logic gate for detecting a majority among the first through third match signals to generate a baud rate signal upon detection of the majority, and a control section for controlling the transmitting station and the receiving section based on the baud rate signal.

According to the present invention, the baud rate generation circuit generates a correct baud rate signal by the first interim baud rate signal against the second interim baud rate signal. Accordingly if a mismatch caused by a failure of the programmable counter can be prevented.

That is the match of both the interim baud rates from a transmission section and a reception section of the transmitting station is observed at any time so that the reliability for data transmission in a correct baud rate is very high. If mismatch occurs between the baud rates from the transmitting section and the receiving section of the transmitting station, the error can be detected immediately so that transmitting/receiving retry can be executed without waiting until the completion of one data frame transmission. The receiving station may have another baud rate generation similar to that in the transmitting station.

The above and other objects, features and advantages of the present invention will be more apparent from the following description, referring to the accompanying drawings.

PREFERRED EMBODIMENTS OF THE INVENTION

Now the present invention is more specifically described with reference to the accompanying drawings, wherein similar constituent elements are designated by the same or similar reference numerals throughout the drawings.

Figure 7:
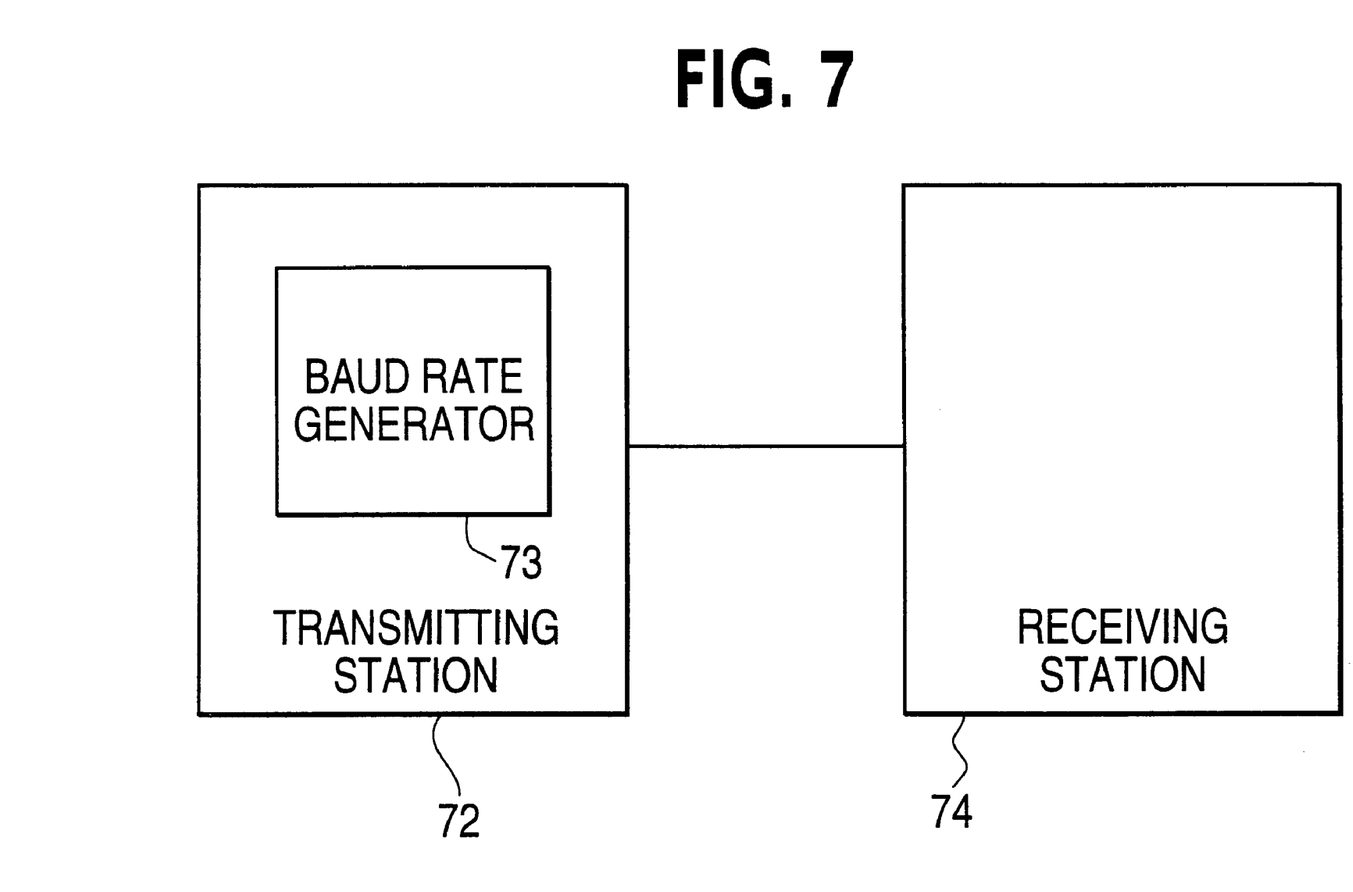
FIG. 7 is a block diagram of a system of the present invention.

FIG. 7 shows a data system according to the present invention including a transmitting station 72, a receiving station 74 and a baud rate generator 73 disposed within each of the transmitting station 72 and the receiving station 74.

Figure 3:
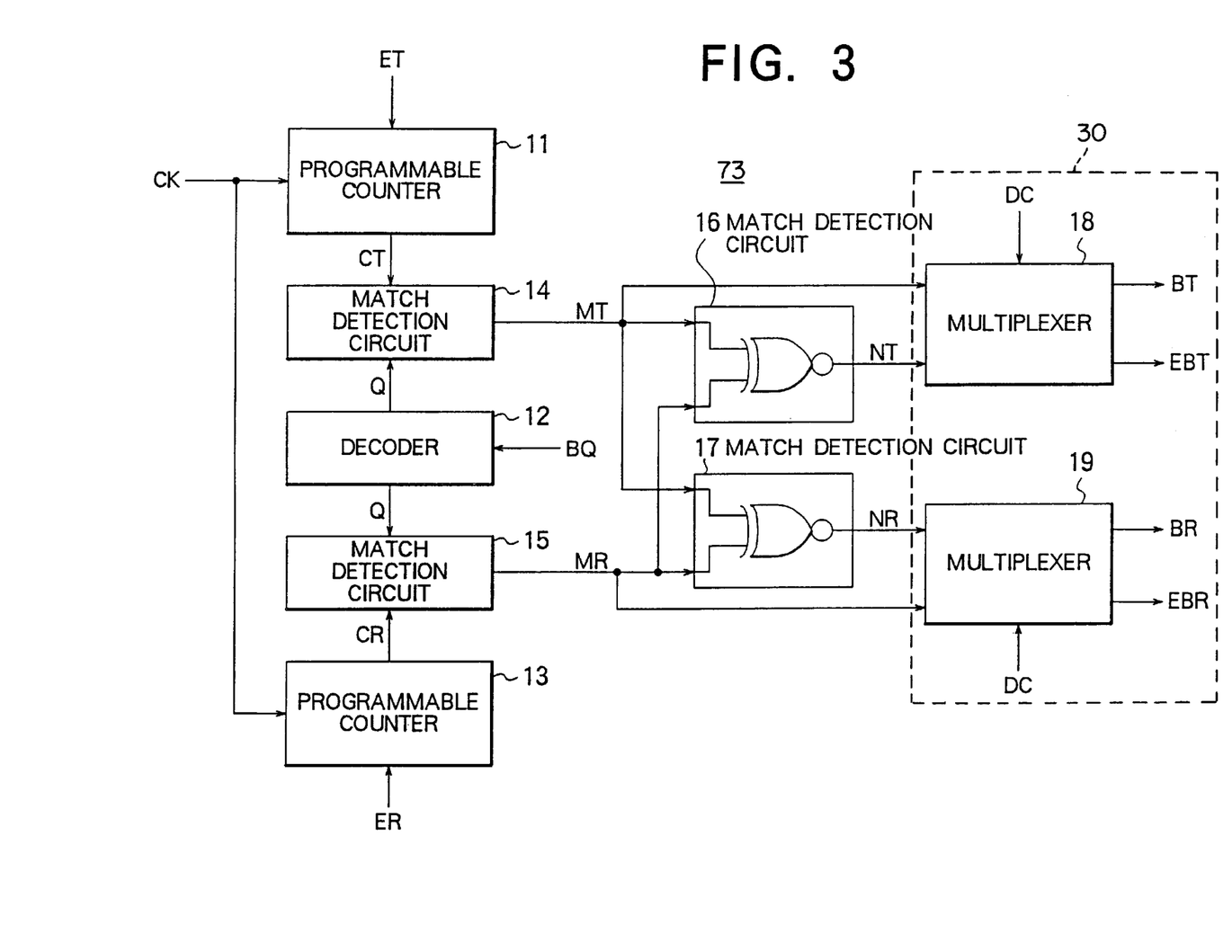
FIG. 3 is a block diagram of a baud rate generation circuit according to a first embodiment of the present invention.

Referring to FIG. 3, the baud rate generation circuit 73 in each of a transmitting station 72 and a receiving station 74 comprises first and second programmable counters 11 and 13, a decoder 12, first match detection circuit 14 in a transmitting section and a second match detection circuits 15 in a receiving section for generating an interim transmission baud rate signal MT and an interim reception baud rate signal MR, all of which are similar to those in the conventional baud rate generation circuit. The baud rate generation circuit further comprises additional third and fourth match detection circuits 16 and 17 for generating transmission and reception enable signals NT and NR respectively, after determining match of the interim baud rates MT and MR received from the first and second baud rate generators 14 and 15 and a control section 30 including a pair of multiplexers 18 and 19. Responding to a half-duplex signal DC for defining a half-duplex operation mode supplied from the control register not shown, the multiplexer 18 generates either a transmission baud rate signal BT or an error signal EBT depending on the value of transmission enable signal NT, the multiplexer 19 generates either a reception baud rate signal BR or an error signal EBR depending on the value of receiving enable signal NR.

Figure 4:
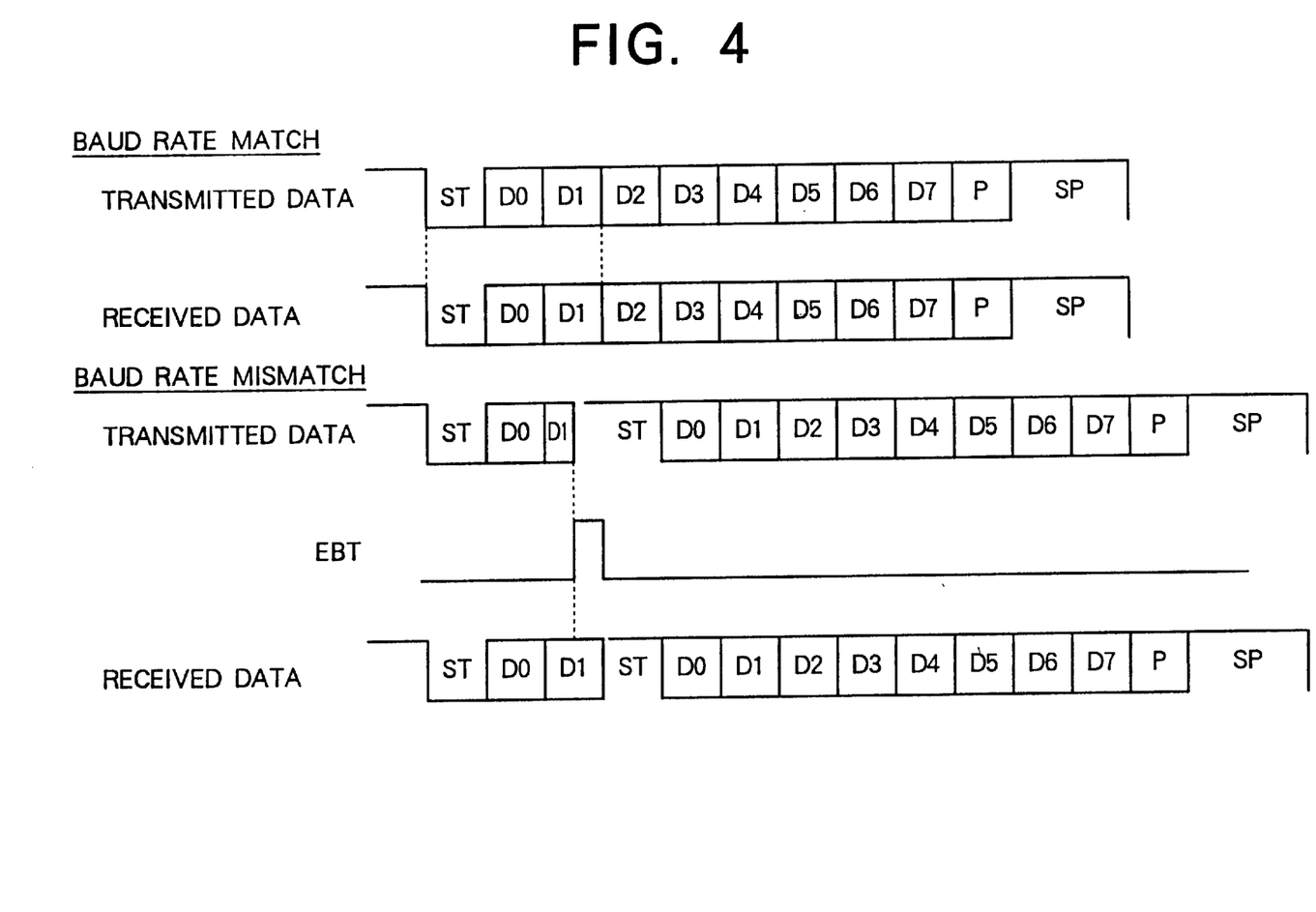
FIG. 4 is a timing chart of the operation of the baud rate generation circuit of FIG. 3.

FIG. 4 shows a timing chart for the cases of a baud rate match and a baud rate mismatch in the operation of the baud generation circuit of FIG. 3. The decoder 12 in each of the transmitting station and receiving station specifies a reference value Q responding to the setting signal BQ in the half-duplex communication as in the conventional method. The first programmable counter 11 is activated responding to a transmission enable signal ET to generate a transmission count CT by counting clock CK. The first match detection circuit 14 compares the reference value Q and the transmission count CT to generate a transmission interim baud rate signal MT. Similarly, the second programmable counter 12 counts the clock CK by responding to a receiving enable signal ER to generate a reception count CR. The second match detection circuit 15 compares the specified value Q and the reception count CR to generate the interim reception baud rate signal MR. The third or fourth match detection circuit 16 or 17 detects a signal MT or MR for transmission or reception NT or NR enable signal respectively. As the third or fourth match detection circuit 16 or 17, an exclusive NOR circuit is used, for example. The multiplexer 18 or 17 generates a transmission baud rate signal BT or a reception baud rate signal BR when either of enable signal NT or NR is "1" for the transmission interim baud rate signal MT or the reception interim baud rate signal MR. On the other hand, if either of the enable signal NT or NR is "0", the multiplexer 18 or 17 generates a transmission error signal EBT or a reception error signal EBR.

The multiplexer 18 or 19 is set for making NT or NR signal effective responding to a half-duplex signal DC for defining a half-duplex operation mode. In the case of full-duplex communication mode, both of NT and NR enable signals are negated and the nominal baud rate signals MT and MR are directly delivered as the baud rate signals BT and BR.

As shown in FIG. 4, when the transmission interim baud rate MT and the reception interim baud rate MR are found to be matched therebetween at the transmitting station or the receiving station, the communication is performed normally as in the conventional system. In this case, the occurrence of match between MT and MR is observed at anytime to obtain a reliable baud rate for both BT and BR in each of the transmitting station and receiving station.

If there is a counting error in the program counter 11 to cause a difference between the transmission count CT and the reception count CR obtained by the program counter 12 in either the transmitting station or the receiving station, the interim baud rate signals MT and MR do not match therebetween.

For example, if the second character bit D1 in the transmitted data is mismatched in FIG. 4, the mismatched bit D1 in the transmitted data is detected at this time for making both the enable signals NT and NR "0". By responding to the "0" value, both the multiplexers 18 and 19 deliver error signals EBT and EBR. The transmitting station immediately instructs the own baud rate generator for restarting from the start bit ST and transmits the error signal EBT to the receiving station. The baud rate generator at the receiving station re-generates a baud rate BR by responding to the error signal EBT to restart the communication from the start bit ST.

Figure 5:
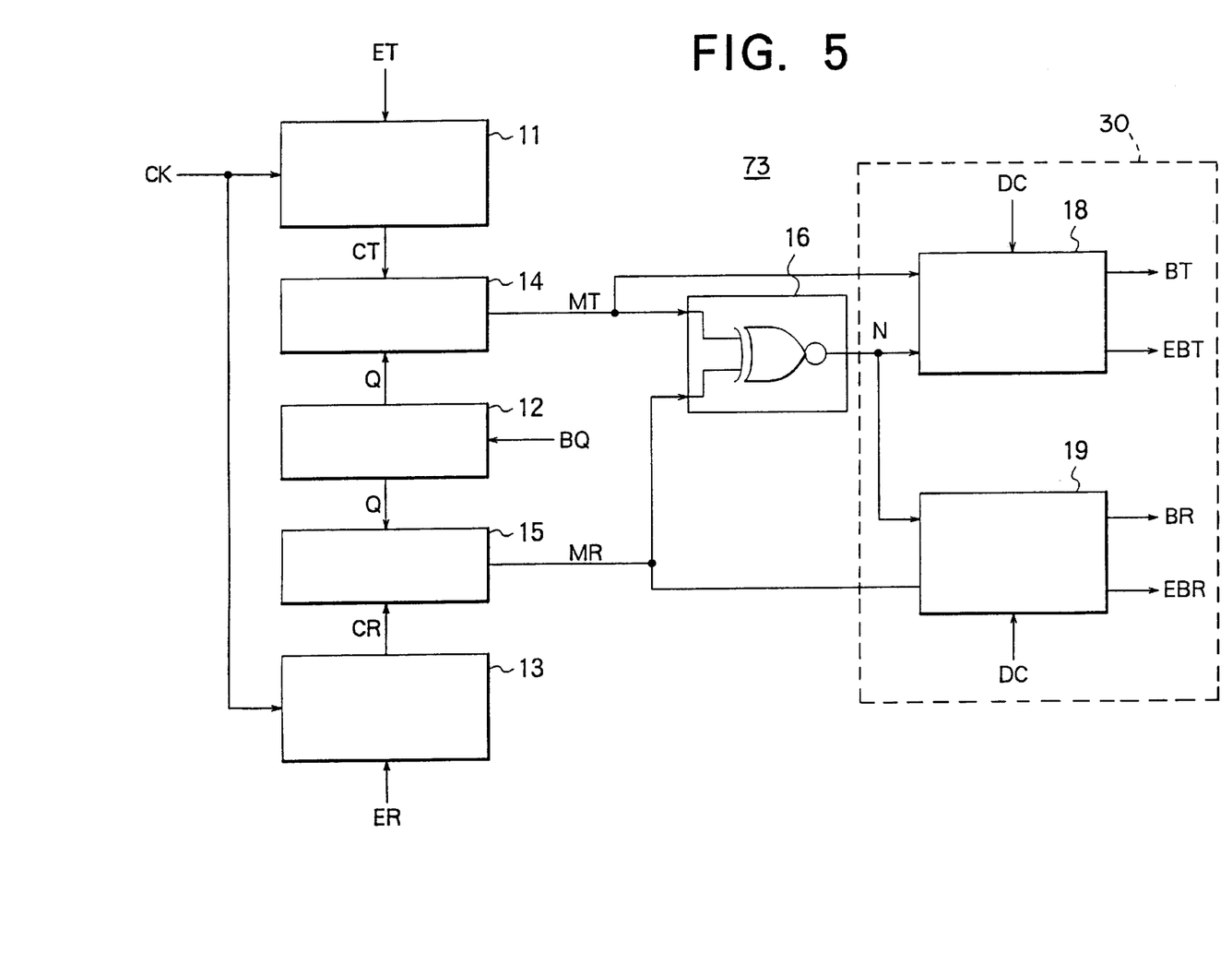
FIG. 5 is a block diagram of a baud rate generation circuit according to a second embodiment of the present invention.

Referring to FIG. 5, a baud rate generator 73 according to a second embodiment of the present invention is similar to the first embodiment shown in FIG. 3 except that a single match detection circuit 16 is provided instead of the third and fourth match detection circuits in FIG. 3.

Figure 6:
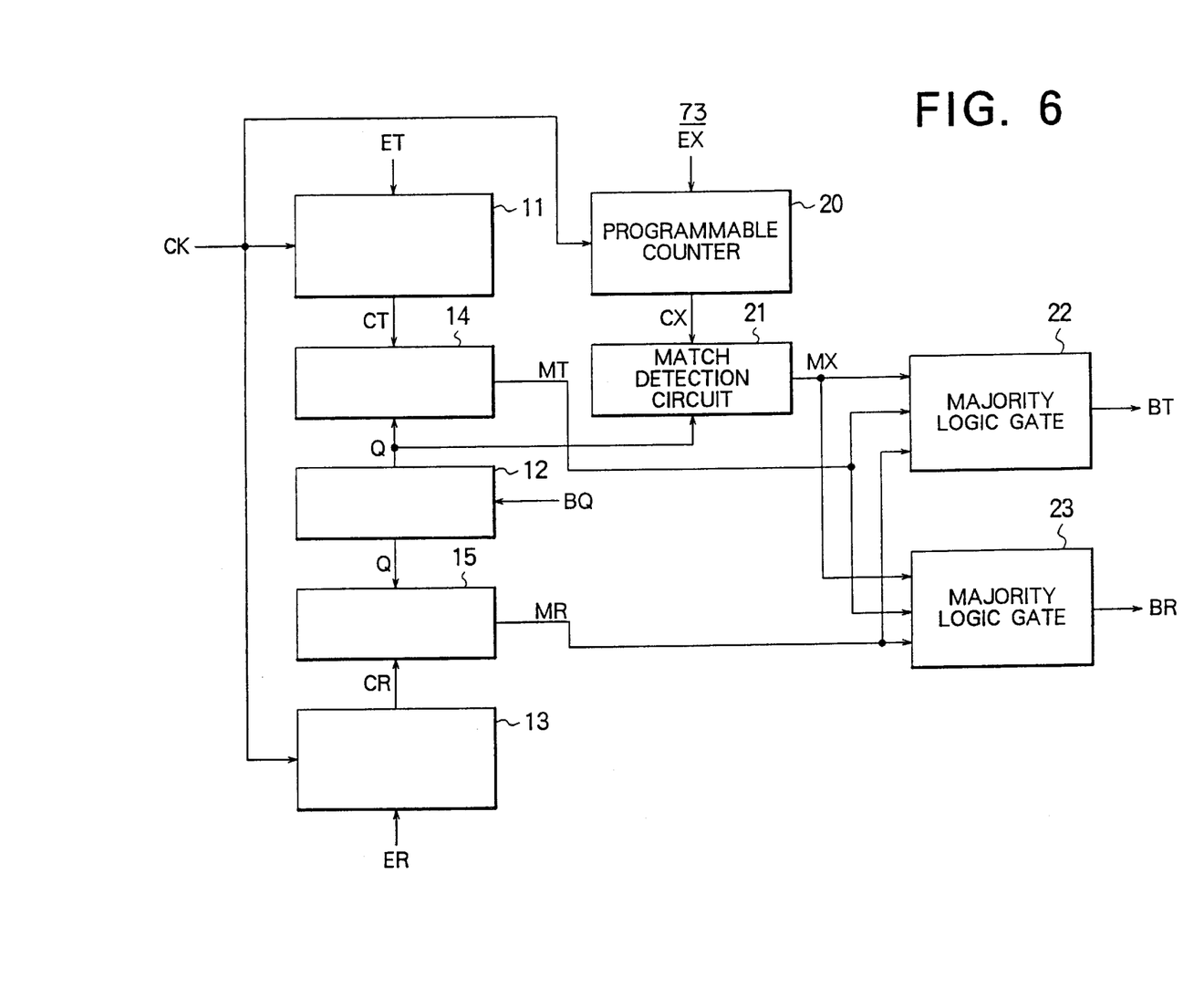
FIG. 6 is a block diagram of a baud rate generation circuit according to a third embodiment of the present invention.

Referring to FIG. 6, a baud rate generator 73 according to a third embodiment of the present invention is similar to the first embodiment except that a programmable counter 20 is provided instead of the programmable counters 11 and 13 for generating a count CX after counting the clock CK by responding to a transmitting/receiving enable signal EX, instead of the match detection circuits 16 and 17 and the multiplexers 18 and 19 in the control section 30 of the first embodiment, that a match detection circuit 21 for generating an interim baud rate signal MX after detecting a match between the reference value Q supplied from the decoder 12 and the count CX, and that majority logic gates 22 and 23 are provided for detecting a majority among signals MT, MR and MX to generate a transmission baud rate signal BT and a reception baud rate signal BR respectively. In a modification of this embodiment, a plurality of programmable counters 20 or a plurality of match detection circuits 21 may be provided.

The majority logic gates 22 and 23 generate a majority signal when two or three of signals among the interim signals MT, MR and MX supplied from the programmable counters 11, 13, and 20 are identical.

In the present embodiment, it is unlikely that all the programmable counts CT, CR and CX do not match one another and unable to determine by the majority logic gates except for a system break-down. Accordingly, a highly reliable baud rate is obtained.

Since the above embodiments are described only for examples, the present invention is not limited to the above embodiments and various modifications or alterations can be easily made therefrom by those skilled in the art without departing from the scope of the present invention.

What is claimed is:

1. A data communication system comprising: a transmitting station for transmitting data; a receiving station for receiving the data transmitted by said transmitting station; and a baud rate generator disposed in the transmitting station, the baud rate generator including first and second counters for counting clocks in a clock signal from a specified time to generate a first count and a second count, respectively, a decoder for setting a reference value in response to a set instruction signal, a first match detection circuit for detecting a match between said reference value and said first count to generate a first match signal, a second match detection circuit for detecting a match between said reference value and said second count to generate a second match signal, a third match detection circuit for observing a mismatch between said first match signal and said second match signal to generate an error signal upon the mismatch, and a control section for controlling said transmitting station and said receiving station, upon occurrence of said error signal, to re-transmit data starting from said specified time between said transmitting station and said receiving station.

2. A data communication system as defined in claim 1, wherein said third match detection circuit comprises an exclusive NOR gate for receiving said first and second match signals.

3. A data communication system as defined in claim 1, wherein said third match detection circuit comprises a pair of exclusive NORs each receiving said first and second match signals.

4. A data communication system as defined in claim 1, said control section comprises a pair of multiplexers each receiving said error signal and said first or second signal to pass said error signal or said first or second match signal depending on mismatch or match of said first match signal and second match signal.

5. A data communication system comprising: a transmitting station for transmitting data; a receiving station for receiving the data transmitted by said transmitting station; and a baud rate generator disposed in the transmitting station, the baud rate generator including first through third counters for counting clocks in a clock signal from a specified time to generate a first through third counts, respectively, a decoder for setting a reference value in response to a set instruction signal, a first through third match detection circuits for detecting matches between said reference value and said first count to generate a first match signal, between said reference value and said second count to generate a second match signal, between said reference value and said third counts to generate a third match signal, respectively, a majority logic gate for detecting majority among said first through third match signals to generate a baud rate signal, and a control section for controlling said transmitting station and said receiving section based on said baud rate signal.

* * * * *